United States Patent [19]

Thyoux

[11] 4,046,550
[45] Sept. 6, 1977

[54] GLASS CONTAINER MAKING MACHINE

[75] Inventor: George A. Thyoux, Soignies, Belgium

[73] Assignee: Durobor S.A., Soignies, Belgium

[21] Appl. No.: 587,993

[22] Filed: June 18, 1975

[30] Foreign Application Priority Data

June 20, 1974 Belgium .................................. 145655

[51] Int. Cl.² ............................................. C03B 9/00
[52] U.S. Cl. ....................................... 65/229; 65/237;
65/240; 65/264; 65/361
[58] Field of Search .................. 65/361, 237, 231, 229,
65/230, 264, 240

[56] References Cited

U.S. PATENT DOCUMENTS

| 1,393,118 | 10/1921 | Hall | 65/231 |
|---|---|---|---|
| 1,904,959 | 4/1933 | Soubier | 65/361 X |
| 2,011,187 | 8/1935 | Rowe | 65/264 X |
| 3,434,820 | 3/1969 | Zappia et al. | 65/229 X |
| 3,730,699 | 5/1973 | Dichter | 65/361 X |
| 3,803,877 | 4/1974 | Becker et al. | 65/229 X |
| 3,834,884 | 9/1974 | Kurokawa et al. | 65/361 X |
| 3,841,859 | 10/1974 | Becker et al. | 65/361 X |
| 3,914,120 | 10/1975 | Foster | 65/361 X |

*Primary Examiner*—S. Leon Bashore
*Assistant Examiner*—Frank W. Miga

[57] ABSTRACT

Two molds attached to the same carriage and filled with molten glass in the form of a gob, are presented by a roller track from beneath a pair of blowing spindles or pipes with which the molds are nested until the glass therein is fixed or set in the clamping means of the spindles, after which the molds disengage from the parisons attached to the spindles by a descending portion of the roller track which guides their carriage. The carriages are moved along the roller track by an endless chain conveyor synchronized with the movement of the glass forming machines carrying the pair of blowing spindles. The parisons attached to the spindles are then formed and blown into the containers in the normal manner of that of a "Westlake" turntable type of glass container making machine.

4 Claims, 2 Drawing Figures

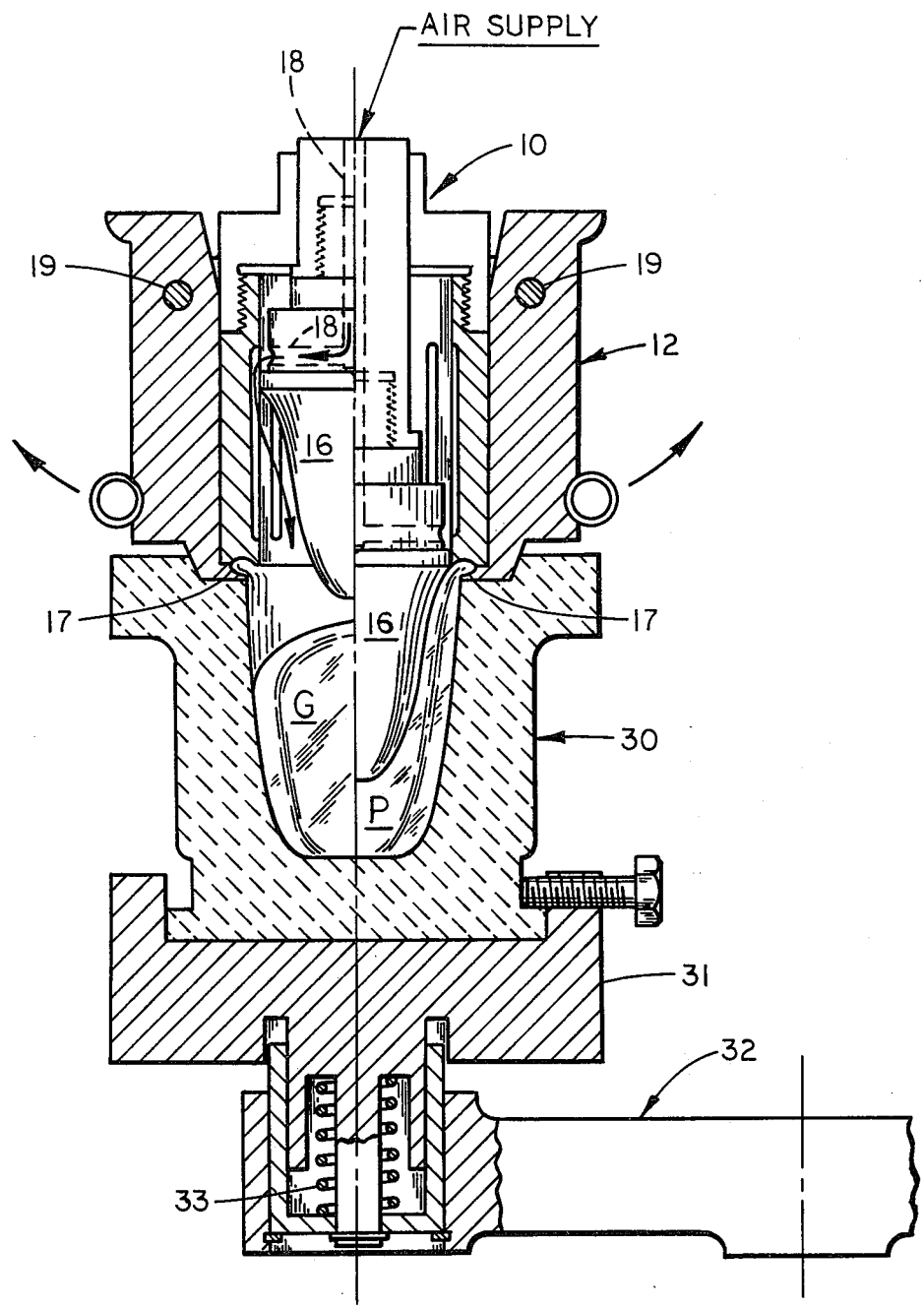
FIG. II

GLASS CONTAINER MAKING MACHINE

BACKGROUND OF THE INVENTION

The present invention relates to an improvement applied to the Westlake type of glassware making machine, used for the manufacturing of drinking mugs, glass bowls having a foot, and other glass containers. According to the prior art, this machine is supplied by a suction arm which moves out to gather the molten glass in the furnace and returns to deposit it on the blowing spindles of the machine. This supply by a suction arm has a certain number of inconveniences, namely, that firstly, the glass is gathered at the surface of the furnace, that is at a position where the dangers of heterogeneity in temperature or composition are at a maximum, while secondly, the cutting of the glass after the suction action also causes bubbles and heterogeneities which are very difficult to eliminate subsequently. In addition, this process gives a glass blank a rough shape which is not very well developed and of which the finishing takes a relatively long time and represents a true obstacle to the production capacity.

SUMMARY OF THE INVENTION

Generally speaking, the present invention comprises the addition of an horizontal endless conveyor supporting carriages which may be vertically movable as they ride around a track. These carriages contain parison forming molds into which gobs of glass may be dropped as they pass along one reach of the conveyor. Then as the molds pass under the blowing spindles or pipes of the rotating glassware making machine along the other reach of the conveyor, they are moved upwardly by a ramp in the track to engage the clamping means of the spindles to form parisons which attach to the spindles by setting of the glass as the molds move along with the spindles of the machine. Then the molds are removed by a descending portion of the track leaving the parisons attached to the spindles for formation into the containers by the machine in the Westlake manner. In order to insure synchronism of the movement of the conveyor with that of the machine as it moves from one station to the next in forming the containers, there is provided a direct drive, such as by gearing, between the machine and the conveyor.

The gobs of glass fed to the parison molds on the conveyor are sheared off from an aperture in a trough from the furnace and dropped down chutes directing the gobs into the molds. Since the shears and conveyor both are synchronized with the movement of the machine, each gob is dropped directly into a corresponding parison mold. A roller may be provided on the carriage for reducing the friction between it and the track. A plurality of carriages may be provided along the conveyor, and each carriage may contain one or more molds usually a pair, corresponding to the pair of spindles generally employed in the Westlake type of glass container forming machine.

OBJECTS AND ADVANTAGES

The apparatus according to the present invention prevents the inconveniencies and difficulties above mentioned in the section of Background of the Invention, and permits a Westlake type of machine to be supplied with glass parisons produced by a conventional supply arrangement and eliminates the suction arms previously associated with such machines.

It is an object of this invention to produce an efficient, effective, economic, durable, and simple improved means for supplying glass to blowing pipes of glassware manufacturing apparatus, particularly to a Westlake type machine.

Another object is to produce a machine that will deliver heterogeneous glass gobs free of bubbles, and attach them to blowing spindles of a Westlake type of glass forming machine.

BRIEF DESCRIPTION OF THE VIEWS

The above mentioned and other features, objects and advantages and a manner of obtaining them are described more specifically below by reference to an embodiment of this invention shown in the accompanying drawings, wherein:

FIG. I is a schematic perspective view of a Westlake type glassware making machine having a preferred embodiment of the conveyor and mold carriage apparatus of the present invention shown connected thereto at the right and front of the Figure; and FIG. II is an enlarged vertical sectional view through the downward end of one of the blown pipes and clamping means of the machine in FIG. I engaging a parison mold mounted on the carriage in the conveyor shown at the right front in FIG. I; the left half of which shows the gob in the mold with the plunger raised, and the right half showing the gob formed into a parison by the lowered plunger, which parison is attached to the clamping means of the blowing spindle.

DETAILED DESCRIPTION OF PREFERRED EMBODIMENT

Figure 1:
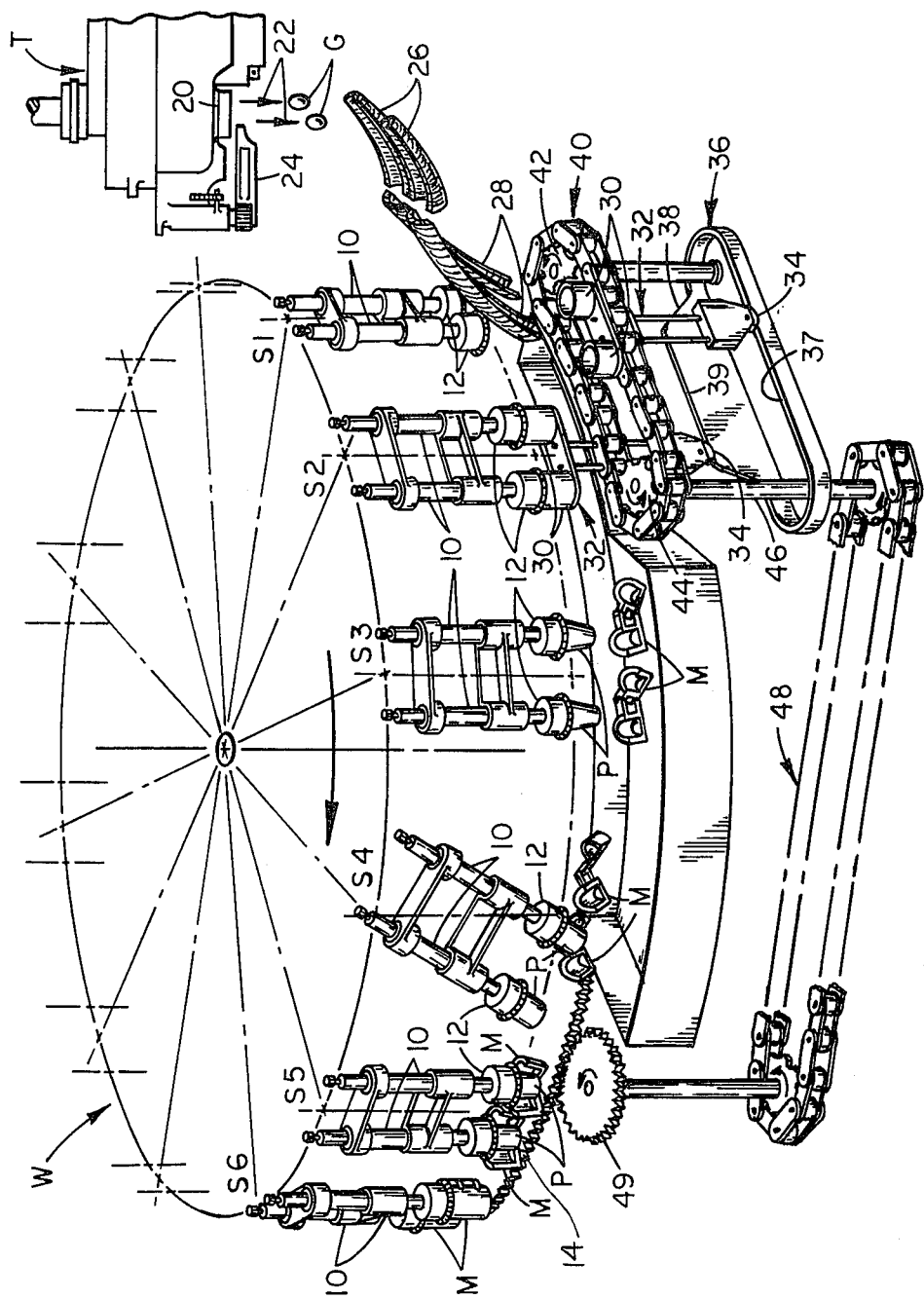

Referring first to FIG. 1 there is partially schematically shown the rotating carousal or turntable of a Westlake type of glass container forming machine W showing pairs of blowing spindles 10 located at each of six of the stations S1, S2, S3, S4, S5, and S6 around the front side of the machine W. At the stations S3 through S6, below the lower ends of the spindles 10 carrying the parisons P, are shown corresponding pairs of blow molds M as they gradually raise from below the spindles up into engagement around the spindles in station S6. The parisons P are held onto the lower ends of the spindle 10 by the clamping means 12 as is shown in detailed in FIG. II to be described later.

At the left the machine W in FIG. I there is shown the end of the trough T through which molten glass is supplied to the machine W from a furnace (not shown), which trough T contains a pair of discharge apertures 20 for discharging a pair of gobs G in accordance with and in the direction of the arrows 22 cut off from the apertures by the automatic shears 24 synchronized with the operation of the machine W. Below these apertures 20 there are provided pairs of chutes or channels 26 and 28 for directing the cut off gobs G into the parison molds 30. There are provided a pair of these molds 30 to correspond with the pair of gobs discharged from the apertures 20, the pairs of directing chutes or channels 26 and 28, and the pairs of spindles 10 and clamping means 12. The molds 30 are supported by a vertically movable carriage 32, the lower end of which may be provided with a roller 34 for guidance around a track 36. The track 36 is vertically aligned with an endless chain conveyor 40 which moves the carriages 32 around the track 36. This conveyor 40 may be provided with sprocket wheels 42 and 44 at opposite ends of its reaches, one of which may be keyed to a shaft 46 which is directly connected with the ring gear 14 on the Westlake machine W via chain drive and gearing mechanism 48 and 49, respectively. Thus synchronism of the movement of the conveyor chain 40 with the rotating movement of the machine W is insured. Although only two carriages 32 are shown on the conveyor chain 40, there may be provided up to twelve carriages thereon, and each of the carriages may have one, two or more molds.

It is to be clearly understood that a certain number of accessories, not shown, insuring the good operation of the mechanism, such as lubrication, and cooling of the molds, protection of rotating parts, etc., may be added to the apparatus described herein without departing from this invention.

Now the operation of the apparatus and machine will be described in combination with FIGS. I and II. Referring first to FIG. I, the gobs G sheared from the apertures 20 slide through the channels 26 and 28 into the two parison molds 30 so as to fill these molds as shown in the left half of FIG. II. The molds 30 are then moved along the reach 37 of the track 36 away from the machine W, while their carriage 32 is in its lower position. As the molds 30 are molded around the sprocket wheel 42 into a position underneath a set of spindles 10 of the machine W, they are raised up by an incline 38 in the track 36 so that the molds 30 engage the clamping means 12 mounted at the lower end of the spindles 10 as shown in FIG. II. Each mold 30 may have its own mold holder 31 mounted to the carriage 32 through a compression spring 33 to insure snug engagement between the top of the mold 30 and the bottom edge of the clamping means 12. With the molds 30 now in engagement with the lower ends of the spindles 10, plunger 16 is moved downwardly as shown in the right half of FIG. II from its normal retracted position shown in the left half of FIG. II, so as to force the gob G into the parison shaped P and overflow the gob into the recessed edge or groove 17 of the clamping means 12, so that as soon as the glass sets sufficiently as it travels along with the rotating machine W, it will be held in this recess 17 and become attached to the spindles 10. Thus, when station S2 is reached, the carriage 32 descends from its upper reach 39 of the track 36 back to its lower level 37, thus removing or lowering the parison molds 30 from the parisons P so the parisons P can be formed in a normal manner in the Westlake machine W.

Station S3 shows the parisons P hanging free from molds 30, so that they may be oscillated at station S4 before the blowing molds M are brought up and around the parisons P as shown at stations S5 and S6. Then the containers can be blown through the air ducts 18 provided in the center of the spindles 10 and plungers 16 (see FIG. II) by blowing the parisons outwardly into the blowing molds M. These spindles 10 also may be rotated during the blowing, and after the container has been formed, the blowing molds M are opened, and so are the jaws of clamping means 12 by being swung apart around the pair of pivots 19 shown in FIG. 11, for the removal of the rim from the clamping groove 17.

Once gob G has set so that the parison P is anchored into the groove 17, the plunger 16 is retracted into the position shown at the left in FIG. II. This occurs before the blowing molds M are clamped around the parisons P, and thereafter the blowing air is introduced into the ducts 18 for expanding the parisons into their blowing molds M.

Thus, while molds 30 on one of the carriages 32 on a conveyor 40 are being loaded with gobs G, other gobs G in other molds 32 are being pressed by plungers 16 into parisons P, while still other molds 30 are being removed from the parisons P, and so on this cycle is repeated successively as the machine W continues to operate.

While there is described above the principles of this invention in connection with a specific apparatus, it is to be clearly understood that this description is made only by way of example, and not as a limitation to the scope of this invention.

I claim:

1. In a glass container forming machine comprising:
   A. a circular horizontal frame rotatable about a vertical axis,
   B. a plurality of vertically movable blowing spindles spaced at equal angular distances around the periphery of said frame, and
   C. parison rim clamping means on each of said spindles, the improvement comprising:
   D. a peripheral ring gear on said frame,
   E. an endless parison mold conveyor of sprocket chain links having two substantially parallel oppositely moving reaches in the same horizontal plane, one reach adjacent the periphery of said frame and the other reach spaced outwardly therefrom,
   F. gearing means driven by said ring gear for continuously moving said conveyor in synchronism with the periphery of said frame,
   G. at least one vertically movable carrier mounted on a stem vertically slidable through a pivot of said conveyor chain link
   H. a parison mold cooperable with the lower ends of said spindles supported by said carrier,
   I. means for dropping a molten glass gob into said parison mold as it moves along said other reach of said conveyor,
   J. cam track means along and vertically below the entire path of said conveyor,
   K. a roller on the lower end of said stem engaging said track for supporting said carrier and guiding its vertical movements first toward and then away from the lower ends of said spindles when said mold moves along said one reach of said conveyor, and
   L. plunger means on said spindles for vertical downward movement for forming a parison from said glob in said mold and attaching said parison to said clamping means while said mold moves along said other reach of said conveyor, whereby said parison is transferred from said mold to a spindle.

2. A machine according to claim 1 wherein said carrier supports a plurality of said parison molds.

3. A machine according to claim 1 wherein said conveyor has a plurality of said carriers spaced relatively to the spacing of said spindles on said frame.

4. A machine according to claim 3 wherein said carrier has a pair of parison molds and each spindle location has a pair of spindles cooperable therewith.

* * * * *

UNITED STATES PATENT OFFICE
CERTIFICATE OF CORRECTION

Patent No. 4,046,550   Dated September 6, 1977

Inventor(s) George A. Thyoux

It is certified that error appears in the above-identified patent and that said Letters Patent are hereby corrected as shown below:

Column 2, line 63, change "The" to - - This - - . Column 3, line 23, change "molded" to - - moved - - . Column 4, line 51, change "glob" to - - gob - - .

Signed and Sealed this

Twenty-first Day of March 1978

[SEAL]

Attest:

RUTH C. MASON
Attesting Officer

LUTRELLE F. PARKER
Acting Commissioner of Patents and Trademarks